United States Patent
Yae (10) Patent No.: US 10,407,027 B2
(45) Date of Patent: Sep. 10, 2019

(54) VEHICLE KEY, VEHICLE, AND METHOD FOR CONTROLLING KEY AND VEHICLE

(71) Applicants: HYUNDAI MOTOR COMPANY, Seoul (KR); KIA MOTORS CORPORATION, Seoul (KR)

(72) Inventor: Seong Soo Yae, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/785,882

(22) Filed: Oct. 17, 2017

(65) Prior Publication Data

US 2018/0354461 A1 Dec. 13, 2018

(30) Foreign Application Priority Data

Jun. 9, 2017 (KR) .................. 10-2017-0072357

(51) Int. Cl.
| | |
|---|---|
| *G10L 15/00* | (2013.01) |
| *B60R 25/25* | (2013.01) |
| *B60R 16/037* | (2006.01) |
| *G10L 15/22* | (2006.01) |
| *G06F 3/16* | (2006.01) |

(52) U.S. Cl.
CPC ........ *B60R 25/257* (2013.01); *B60R 16/0373* (2013.01); *G06F 3/167* (2013.01); *G10L 15/22* (2013.01); *G10L 2015/223* (2013.01)

(58) Field of Classification Search
CPC ......... G10L 15/00; G10L 15/01; G10L 15/08; G10L 15/18; G10L 15/183; G10L 15/22; G10L 15/26; G10L 2015/223; G10L 2015/00; G10L 2015/06; G10L 2015/228
USPC .... 704/275, 231, 235, 236, 243, 270, 270.1, 704/273
See application file for complete search history.

(56) References Cited

U.S. PATENT DOCUMENTS

| | | | |
|---|---|---|---|
| 9,619,645 | B2 | 4/2017 | Bapat |
| 2004/0119580 | A1* | 6/2004 | Spielman ............... B60R 25/102 340/5.52 |
| 2005/0277438 | A1* | 12/2005 | Tilk ..................... B60R 25/2063 455/556.1 |
| 2014/0277837 | A1* | 9/2014 | Hatton .................... B60R 25/24 701/2 |
| 2015/0137207 | A1 | 5/2015 | Chuang et al. |
| 2016/0148453 | A1 | 5/2016 | Chang et al. |
| 2016/0300417 | A1* | 10/2016 | Hatton ............... G07C 9/00857 |

FOREIGN PATENT DOCUMENTS

| | | |
|---|---|---|
| JP | 2016-521379 A | 7/2016 |
| KR | 2010-0078099 A | 7/2010 |
| KR | 10-1618010 B1 | 5/2016 |

\* cited by examiner

*Primary Examiner* — Qi Han
(74) *Attorney, Agent, or Firm* — Morgan, Lewis & Bockius LLP (57) ABSTRACT

A vehicle key includes: a voice input configured to receive a voice command of a user; and the key controller configured to determine at least one of a service type and information indicating whether the vehicle key is disposed in a key groove of a vehicle, and to process at least one of a voice recognition result acquired from the user voice command and a control command corresponding to the voice recognition result on the basis of a result of determination.

17 Claims, 8 Drawing Sheets

FIG. 8

VEHICLE KEY, VEHICLE, AND METHOD FOR CONTROLLING KEY AND VEHICLE

CROSS-REFERENCE TO RELATED APPLICATION

This application claims the benefit of priority to Korean Patent Application No. 10-2017-0072357, filed on Jun. 9, 2017 in the Korean Intellectual Property Office, the disclosure of which is incorporated herein by reference.

TECHNICAL FIELD

The present disclosure relates to a vehicle key, a vehicle, and a method for controlling the same, which receive a voice command, and process the received voice command.

BACKGROUND

In recent times, vehicles have been designed to support remote control services through various devices so as to increase user convenience. For example, the user may receive various remote control services (for example, door open/close, trunk open, warning sound output, etc.) through a vehicle key. Therefore, many developers and companies are conducting intensive research into a method for allowing the user to easily and conveniently use various services through the vehicle key.

SUMMARY

An aspect of the present disclosure provides a key for a vehicle, a vehicle, and a method for controlling the key and vehicle, which receive a voice command from a user and process the received voice command.

Additional aspects of the invention will be set forth in part in the description which follows and, in part, will be obvious from the description, or may be learned by practice of the invention.

In accordance with an aspect of the present disclosure, a vehicle key includes: a voice input configured to receive a voice command of a user; and a key controller configured to determine at least one of a service type and information indicating whether the vehicle key is disposed in a key groove of a vehicle, and process at least one of a voice recognition result acquired from the user voice command and a control command corresponding to the voice recognition result on the basis of a result of determination.

The key controller may determine a security grade on the basis of the result of determination.

The key controller may determine whether to encode at least one of the voice recognition result and the control command corresponding to the voice recognition result on the basis of the determined security grade.

The key controller may determine a transmission method of at least one of the voice recognition result acquired from the user voice command and the control command corresponding to the voice recognition result on the basis of the result of determination.

The key controller may determine an operation method of the voice input on the basis of the information indicating whether the vehicle key is disposed in the key groove of the vehicle.

When the vehicle key is disposed in the key groove of the vehicle, the key controller may control the voice input and the other voice input included in the vehicle to interact with each other such that the voice input and the other voice input operate as a dual microphone.

The key controller may calculate a position of the user who rides in the vehicle using the voice input and the other voice input included in the vehicle, and may control beamforming on the basis of the result of calculation.

In accordance with another aspect of the present disclosure, a vehicle includes: a vehicle communicator configured to receive data associated with at least one of at least one user's voice command, a voice recognition result, and a control command, which are received through a vehicle key; and a vehicle controller configured to provide a service by controlling a device included in the vehicle on the basis of the received data.

The vehicle may further include: a voice input configured to receive a voice command of the at least one user.

The vehicle controller may calculate a position of the at least one user using at least one of the voice input and a voice input included in the vehicle key.

The vehicle controller may perform beamforming on the basis of the calculated position of the at least one user.

The vehicle controller may determine whether to perform a decoding process of the data associated with at least one of the voice command, the voice recognition result, and the control command according to a service type and information indicating whether the vehicle key is disposed in a key groove.

The vehicle controller may determine whether the vehicle key is disposed in a key groove, and controls the voice input to interact with the other voice input included in the vehicle key so that the voice input and the other voice input operate as a dual microphone.

In accordance with another aspect of the present disclosure, a method for controlling a vehicle key includes: receiving a voice command of a user; and determining at least one of a service type and information indicating whether the vehicle key is disposed in a key groove of a vehicle, and processing at least one of a voice recognition result acquired from the user voice command and a control command corresponding to the voice recognition result on the basis of the result of determination.

The processing the at least one of the voice recognition result and the control command may further include: determining a security grade on the basis of the result of determination.

The processing the at least one of the voice recognition result and the control command may further include: determining whether to encode at least one of the voice recognition result and the control command corresponding to the voice recognition result on the basis of the determined security grade.

The processing the at least one of the voice recognition result and the control command may further include: determining a transmission method of at least one of the voice recognition result acquired from the user voice command and the control command corresponding to the voice recognition result on the basis of the result of determination.

The processing the at least one of the voice recognition result and the control command may further include: determining an operation method of the voice input on the basis of the information indicating whether the vehicle key is disposed in the key groove of the vehicle.

The processing the at least one of the voice recognition result and the control command may further include: when the vehicle key is disposed in the key groove of the vehicle, interacting the voice input and the other voice input included in the vehicle with each other, and allowing the voice input and the other voice input to operate as a dual microphone.

In accordance with another aspect of the present disclosure, a method for controlling a vehicle includes: receiving data associated with at least one of at least one user's voice command, a voice recognition result, and a control command, which are received through a vehicle key; and providing a service by controlling a device included in the vehicle on the basis of the received data.

The controlling a vehicle may further include: receiving data associated with at least one of at least one user's voice command, a voice recognition result, and a control command, which are received through a vehicle key; and providing a service by controlling a device included in the vehicle on the basis of the received data.

The providing a service by controlling a device may further include: calculating a position of the at least one user using at least one of the voice input and a voice input included in the vehicle key.

The providing a service by controlling a device may further include: performing beamforming on the basis of the calculated position of the at least one user.

The providing a service by controlling a device may further include: determining whether to perform a decoding process of the data associated with at least one of the voice command, the voice recognition result, and the control command according to a service type and information indicating whether the vehicle key is disposed in a key groove.

The providing a service by controlling a device may further include: determining whether the vehicle key is disposed in a key groove, and controls the voice input to interact with the other voice input included in the vehicle key so that the voice input and the other voice input operate as a dual microphone.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. The embodiments of the present disclosure will hereinafter be described with reference to the attached drawings.

Figure 1:
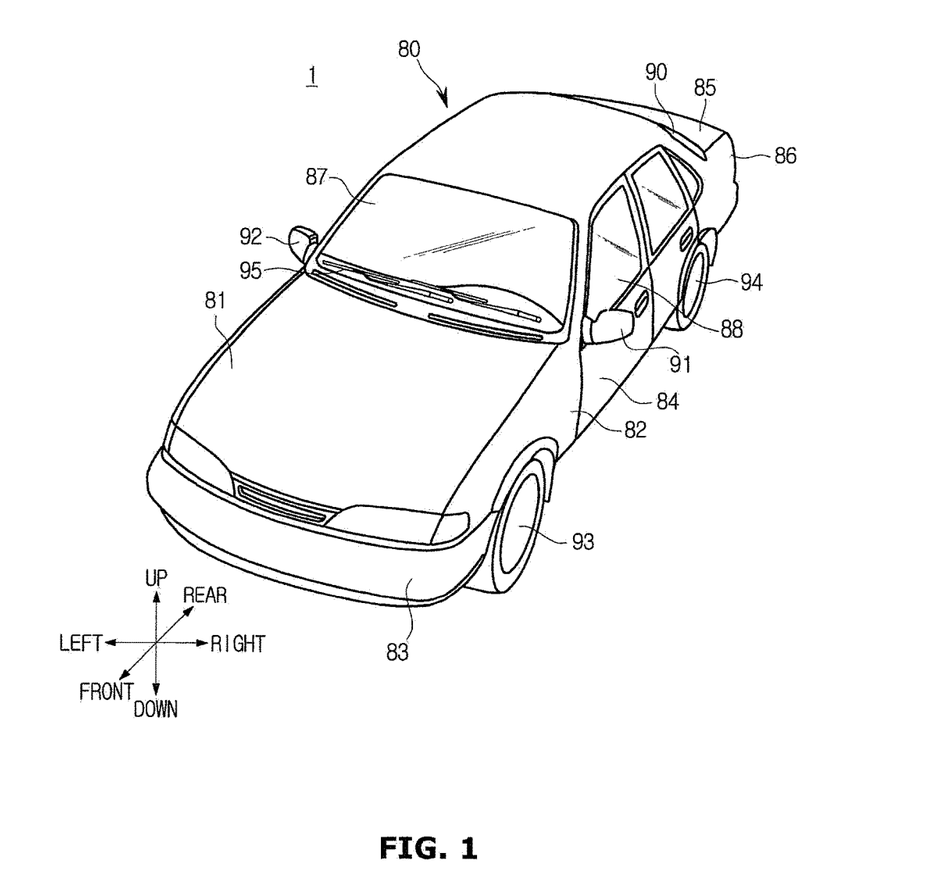
FIG. 1 is a view illustrating the appearance of a vehicle according to an embodiment of the present disclosure.
Figure 2:
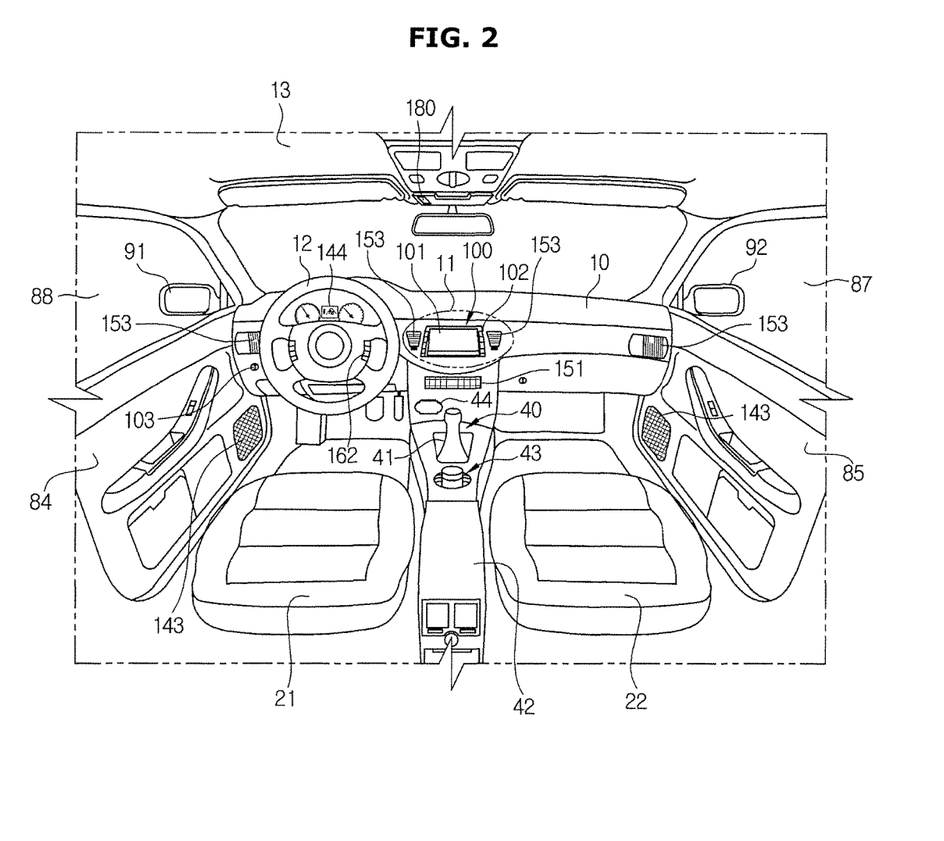
FIG. 2 is a view illustrating the internal structure of the vehicle according to an embodiment of the present disclosure.
Figure 3:
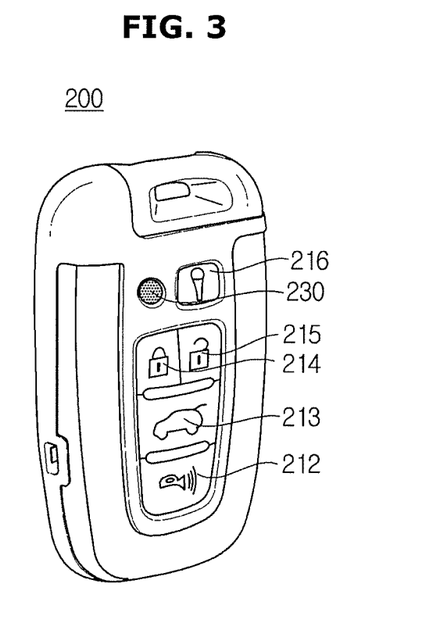
FIG. 3 is a view illustrating a key for a vehicle (hereinafter referred to as a vehicle key) according to an embodiment of the present disclosure.
Figure 4:
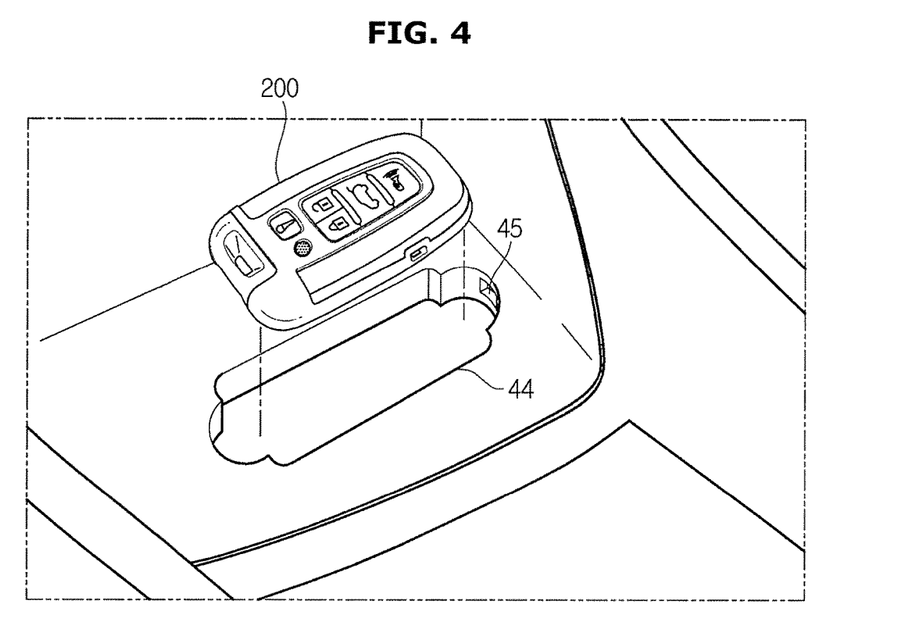
FIG. 4 is a view illustrating a groove of the vehicle key and a key mounted to the key groove according to an embodiment of the present disclosure.

FIG. 1 is a view illustrating the appearance of a vehicle according to an embodiment of the present disclosure. FIG. 2 is a view illustrating the internal structure of the vehicle according to an embodiment of the present disclosure. FIG. 3 is a view illustrating a key for a vehicle (hereinafter referred to as a vehicle key) according to an embodiment of the present disclosure. FIG. 4 is a view illustrating a groove of the vehicle key and a key mounted to the key groove according to an embodiment of the present disclosure. Hereinafter, the embodiments shown in FIGS. 1 to 4 will hereinafter be described to avoid redundant description thereof.

Referring to FIG. 1, a vehicle 1 may include a body 80 forming the appearance of the vehicle 1, and vehicle wheels 93 and 94 to move the vehicle 1 from place to place. The body 80 may include a hood 81, a front fender 82, doors 84, a trunk lid 85, a quarter panel 86, etc.

The exterior part of the body 80 may include a front window (also referred to as a windshield) 87 installed at the front of the body 80 so as to provide a forward view of the vehicle 1 to a vehicle driver who rides in the vehicle 1; side windows (hereinafter referred to as windows) 88 to provide a side view of the vehicle 1; side-view mirrors 91 and 92 installed at the door 84 so as to provide a rear view and a side view of the vehicle 1; and a rear window 90 installed at the rear of the body 80 so as to provide a rear view of the vehicle 1. The internal structures of the vehicle 1 will hereinafter be described.

The vehicle 1 may include an air conditioner 151. The air conditioner 151 may automatically control the air-conditioning environment (including indoor/outdoor environmental conditions of the vehicle 1, air intake/exhaust process, air circulation, cooling/heating, etc.), or may control the air-conditioning environment in response to a control command of the user. For example, the air conditioner 151 may perform heating and cooling of the air, and may discharge the heated or cooled air through an air outlet 153, thereby controlling a temperature of the indoor space of the vehicle 1.

Meanwhile, an audio video navigation (AVN) terminal 100 may be included in the vehicle 1. The AVN terminal 100 may provide not only a navigation function for providing the driver or user with a travel route to the destination, but also audio and video functions. In this case, the AVN terminal 100 may be referred to as a navigation terminal, and may also be referred to by various terms well known to those skilled in the art as necessary.

The AVN terminal 100 may selectively display at least one of an audio screen image, a video screen image, and a navigation screen image on a display 101. In addition, the AVN terminal 100 may display various control screen images related to the vehicle 1 or screen images related to additional functions executable by the AVN terminal 100 on the display 101.

In accordance with one embodiment, the AVN terminal 100 interoperable with the above air-conditioner 151 may display various control screen images associated with the air-conditioner control through the display 101. In addition, the AVN terminal 100 may adjust the air-conditioning environment of the vehicle 1 by controlling the operation state of the air conditioner. In addition, the AVN terminal 100 may display a map including a route to a destination on the display 101 for recognition of the vehicle driver, without being limited thereto.

The display 101 may be located at a center fascia 11 corresponding to the center region of the dashboard 10.

In accordance with one embodiment, the display 101 may be implemented by any one of a Liquid Crystal Display (LCD) panel, a Light Emitting Diode (LED) panel, a Plasma Display Panel (PDP), an Organic Light Emitting Diode (OLED) panel, a Cathode Ray Tube (CRT), etc. without being limited thereto.

A speaker 143 configured to output an acoustic or sound signal may be embedded in the vehicle 1. Therefore, the speaker 143 of the vehicle 1 may output the acoustic or sound signal needed to perform an audio function, a video function, a navigation function, and other additional functions. For example, the vehicle 1 may provide the driver or user with a travel route to the destination through the speaker 143, without being limited thereto.

A navigation input 102 may be located at the center fascia 11 corresponding to the center region of the dashboard 10. The vehicle driver or user may input various control commands using the navigation input 102, and may also input a destination and the like using the same.

The navigation input 102 may be formed in a hard key shape in one region adjacent to the display 101. If the display 101 is implemented as a touchscreen, the display 101 may also perform functions of the navigation input 102.

Meanwhile, a voice input 180 may be included in the vehicle 1. The voice input 180 may receive a voice command from the driver or user. For example, the voice input 180 may be implemented as a microphone. The voice input 180 may receive a voice command uttered by the driver or user through the microphone, and may convert the received voice command into an electrical signal.

For example, the voice input 180 may be mounted to a head lining 13 as shown in FIG. 2, without being limited thereto. The voice input 180 may be mounted on the dashboard 10 or may be mounted to a steering wheel 12 as necessary. The voice input 180 may also be mounted to any place through which a voice command of the driver or user can be easily received, without being limited thereto.

A center console 40 may include a jog-wheel center input 43 or a hard-key center input 43. The center console 40 may be disposed between a driver seat 21 and a passenger seat 22, and may include a gear lever 41 and a tray 43. The center input 43 may perform all or some of functions of the navigation input 102.

In addition, a key groove 44 may be provided in the vehicle 1 such that a vehicle key may be inserted into the key groove 44. Although the key groove 44 may be provided below the air conditioner 151 as shown in FIG. 2, it should be noted that the key groove 44 may also be provided over the center console 40 as necessary. The key groove 44 may also be located at any position where the driver or user can easily insert the vehicle key, without being limited thereto.

Referring to FIG. 4, the key groove 44 may fix a vehicle key 200 during traveling. Therefore, the key groove 44 may be designed to be suitable for the shape of the key 200, and the scope of shapes of the key groove 44 is not limited thereto.

In the following description, the term "vehicle key" may refer to a key capable of starting the vehicle. For example, the vehicle key may be implemented as a key shape. In another example, the vehicle key 200 may also be implemented as an exemplary key shown in FIG. 3, without being limited thereto. The vehicle key 200 will hereinafter be referred to by any of various terms, for example, a smart key, a key fob, etc., without being limited thereto.

The vehicle key 200 may include a manipulation button for allowing the driver or user to input various control commands. For example, as shown in FIG. 3, the vehicle key 200 may include a warning sound output button 212 for receiving a warning sound output command, a trunk open button 213 for receiving a trunk open command of the vehicle 1, and door open buttons 214 and 215 for allowing the driver or user to input door open/close commands of the vehicle 1. The vehicle key 200 according to the embodiment may further include a voice input button 216 for allowing the driver or user to input an activation command of the voice input.

The voice input is embedded in the vehicle key 200, so that the vehicle key 200 may receive a voice command from the user through the voice input, and the voice recognition result acquired through voice processing and a control command may be directly transmitted to the vehicle 1 or may be transmitted to the vehicle 1 through a user terminal (also called a user equipment UE). A detailed description thereof will hereinafter be given.

Referring to FIG. 4, the key groove 44 may also be provided on the center console 40 (see FIG. 2) as described above. In this case, the vehicle key 200 may be inserted into the key groove 44 such that the vehicle key 200 may be connected to the vehicle 1. A terminal 45 may be provided at one side of the key groove 44, and may also be provided at one side of the vehicle key 200. Therefore, the vehicle key 200 may receive a power-supply voltage through the terminal 45, and may communicate with the vehicle 1 by wired communication. The internal structure of the vehicle key 200 will hereinafter be described.

Figure 5:
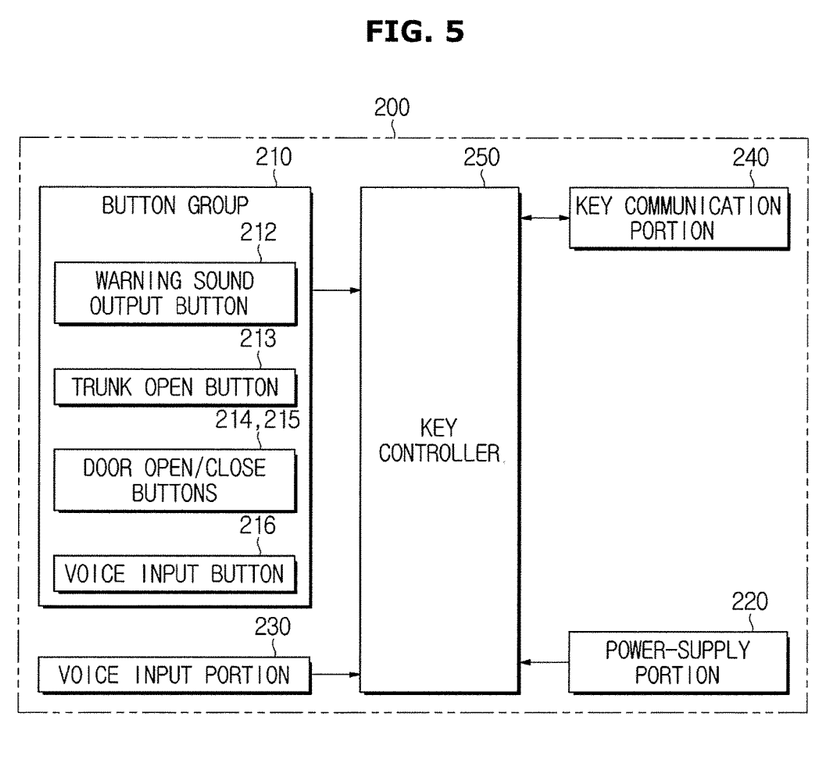
FIG. 5 is a block diagram illustrating the vehicle key according to an embodiment of the present disclosure.
Figure 6:
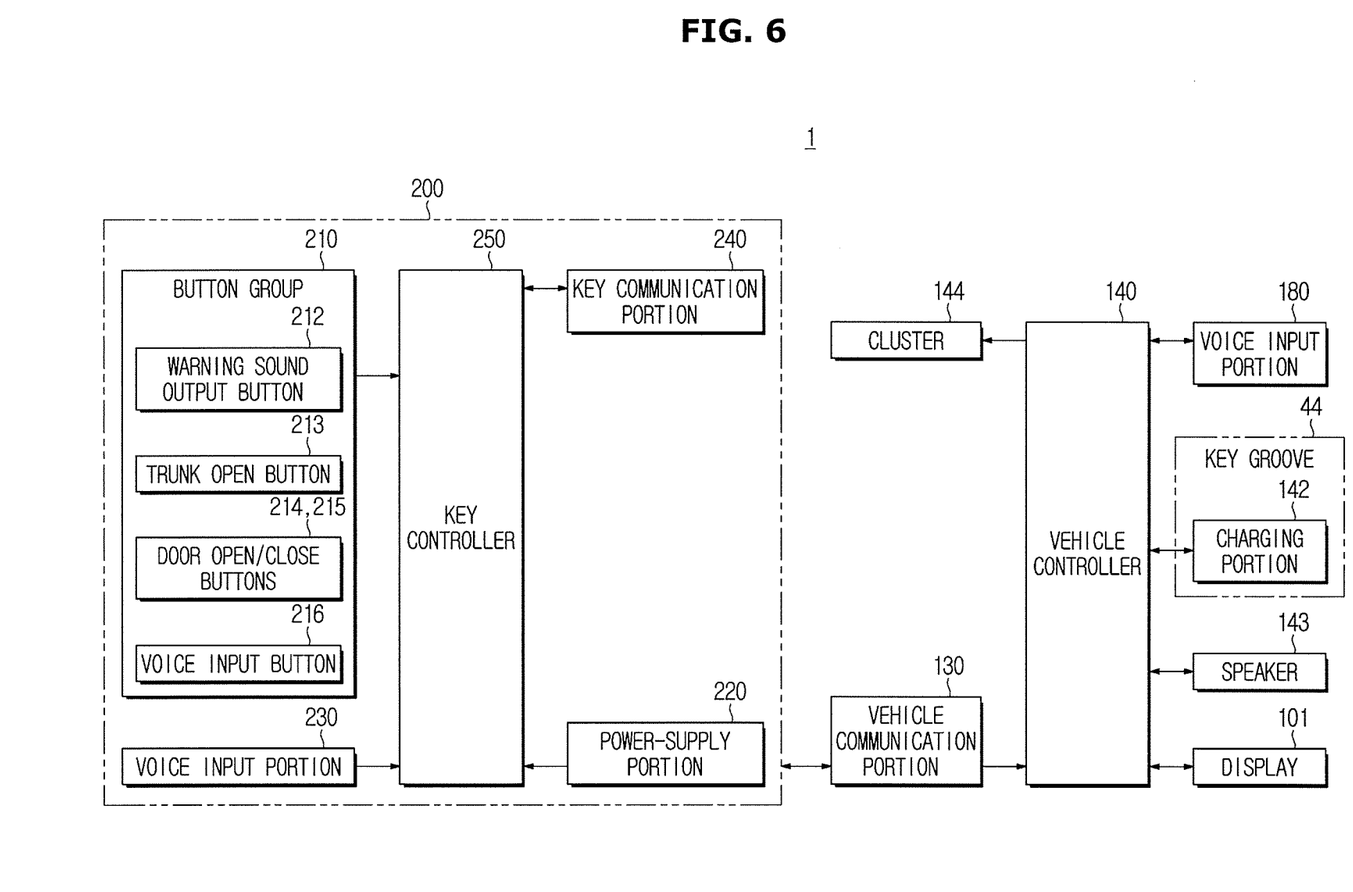
FIG. 6 is a view illustrating service types between the vehicle and the vehicle key according to an embodiment of the present disclosure.
Figure 7:
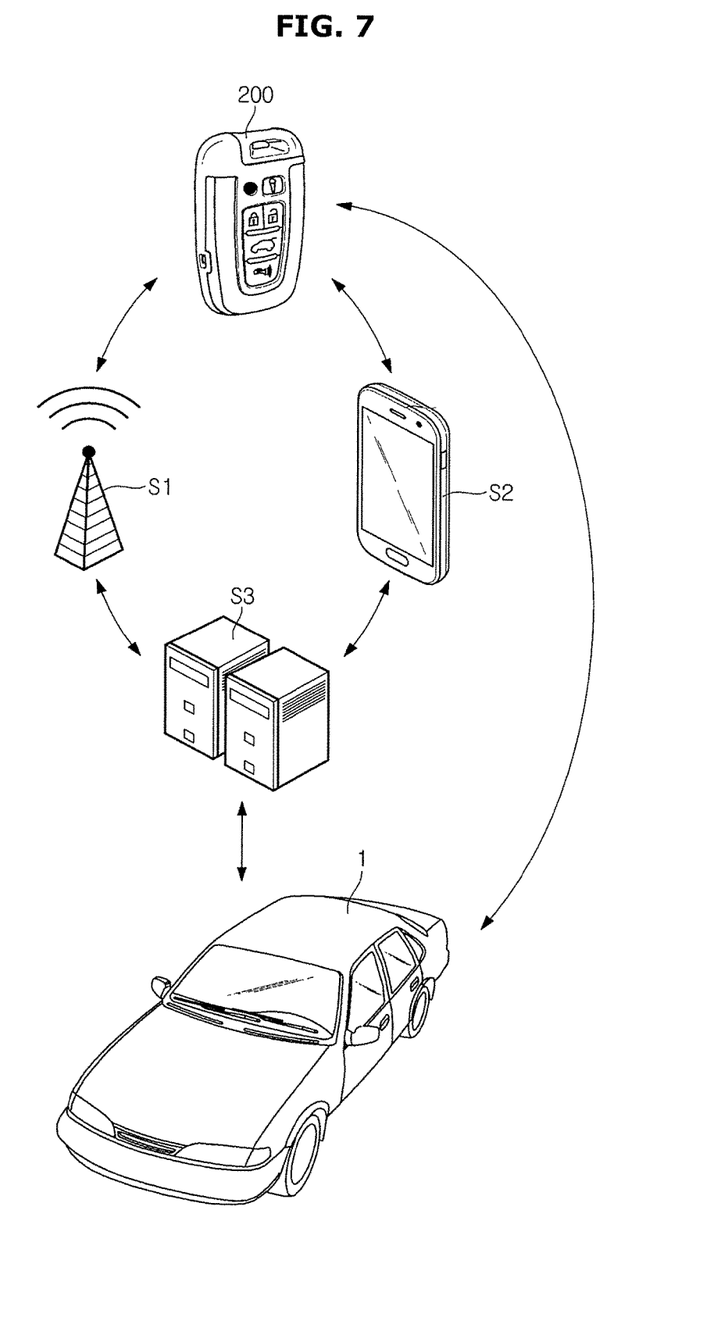
FIG. 7 is a block diagram illustrating the vehicle according to an embodiment of the present disclosure.

FIG. 5 is a block diagram illustrating the vehicle key according to an embodiment of the present disclosure. FIG. 6 is a view illustrating service types between the vehicle and the vehicle key according to an embodiment of the present disclosure. FIG. 7 is a block diagram illustrating the vehicle according to an embodiment of the present disclosure. Hereinafter, the embodiments shown in FIGS. 5 to 7 will hereinafter be described to avoid redundant description thereof.

Referring to FIG. 5, a vehicle key 200 may include a button group 210, a power-supply 220, a voice input 230, a key communicator 240, and a key controller 250. The key communicator 240 and the key controller 250 may be independently provided in the vehicle key 200 or may be integrated into a single System On Chip (SOC) mounted to the vehicle key 200, without being limited thereto. Constituent elements of the vehicle key 200 will hereinafter be described.

The button group 210 may be provided at one side of the vehicle key 200. In this case, the button group 210 may include a plurality of manipulation buttons capable of receiving different control commands. Referring to FIGS. 3 and 4, the button group 210 may include a warning sound output button 212, a trunk open button 213, door open/close buttons 214 and 215, and a voice input button 216.

The button group 210 may be implemented as various well-known switches, for example, a push switch, a micro switch, a membrane switch, a touch switch, etc., without being limited thereto. Alternatively, the button group 210 may also be implemented as a touchscreen display.

Meanwhile, the number of the manipulation buttons included in the button group 210 is not limited to a plural number as shown in FIG. 3. For example, a single touchscreen display may be provided at one side of the vehicle 1, and a Graphical User Interface (GUI) composed of a plurality of icons capable of receiving different control commands may be displayed on the display. The user may input a control command by clicking or touching icons displayed on the display.

Upon receiving an activation command of the voice input 230 through the manipulation buttons, the key controller 250 may allow the voice input 230 to be turned on through a control signal. In more detail, the key controller 250 may allow the voice input 230 to be shifted to a standby mode in which the voice input 230 may receive a voice command of the user through the control signal. A detailed description of the key controller 250 will hereinafter be given.

The power-supply 220 may be provided to the vehicle key 200.

The power-supply 220 may provide constituent elements of the vehicle key 200 with power. In more detail, the power-supply 220 may convert electrical energy into chemical energy, may accumulate the chemical energy, and may convert the accumulated chemical energy into electrical energy, thereby providing power. In accordance with one embodiment, the power-supply 220 may be implemented as a lithium-ion battery, a nickel-hydride battery, a polymer battery, etc. However, the scope of the power-supply 220 is not limited to the above examples, and the power-supply 220 may be implemented as various kinds of batteries that are embedded in the vehicle key 200 to provide power.

The power-supply 220 may be charged with electricity through a wired charging scheme directly connected to the terminal 45 (see FIG. 4) provided at one side of the key groove 44, or may be charged with electricity through a wireless communication scheme. That is, the charging scheme of the power-supply 220 may be carried out according to various schemes well known to those skilled in the art, without being limited thereto. A detailed description of the charging portion will hereinafter be given.

In accordance with one embodiment, a key terminal for supporting wired communication and wired charging may be provided at one side of the vehicle key 200. If the vehicle key 200 is mounted to the key groove 44 (see FIG. 4) of the vehicle 1, the key terminal may be connected to the terminal 45 (see FIG. 4), and the power-supply 220 may receive a power-supply voltage from the charging portion of the vehicle 1 through the terminal 45 (see FIG. 4).

The voice input 230 may receive a voice command from the user. The voice input 230 may be provided at one side of the vehicle key 200 as shown in FIG. 3, but is not limited thereto. In the following description, the term "user" may include not only a vehicle driver but also passengers. Therefore, assuming that the driver or passengers need not be distinguished from each other, the user may be a generic term for the driver and passengers. The voice input 230 may include a microphone. The voice input 230 may receive a voice command uttered by the driver or user through the microphone, and may convert the received voice command into an electrical signal.

The voice command may be converted into the electrical signal through the voice input 230. For example, the voice input 230 may modulate a voice command received through various modulation schemes, for example, a Pulse Width Modulation (PWM) scheme, a Pulse Coded Modulation (PCM) scheme, etc. Other modulation schemes well known to those skilled in the art may also be used to modulate the voice command as necessary.

Meanwhile, the microphone may be implemented as a one-dimensional (1D) or two-dimensional (2D) array of microphones. The key controller 250 may calculate a reception angle of the voice command received through the voice input 230, and may recognize the position of the user who has uttered the voice command on the basis of the calculation result.

The key controller 250 may perform beamforming on the basis of the recognized user position, thereby minimizing noise contained in the voice command. In other words, the key controller 250 may recognize the position of the user, and may perform beamforming on the basis of the recognized user position, resulting in an increased voice recognition rate. In addition, the key controller 250 may be interoperable with the voice input 230 and the other voice input 180 mounted to the vehicle 1, and may perform dual-beamforming, thereby increasing the voice recognition rate of a plurality of users (i.e., the driver and passengers) who ride in the vehicle 1.

In more detail, if the voice input 230 of the vehicle key 200 is mounted to the key groove 44, the voice input 230 of the vehicle key 200 may operate as a built-in microphone (MIC). The voice input portion 230 of the vehicle key 200 and the voice input 180 of the vehicle 1 may operate as a dual microphone. Therefore, the positions of plural users may be recognized and the dual beamforming may be possible Meanwhile, the vehicle key 200 may include a key communicator capable of communicating with the external device.

The key communicator 240 may communicate with the external device over a wireless communication network or a wired communication network. For example, the key communicator 240 may be connected not only to a user equipment (UE) such as a smartphone, but also to an Access Point (AP) such as a relay capable of supporting connection to the Internet over a wireless communication network or a wired communication network, such that the key communicator 240 may communicate with the UE and the AP.

The term "User Equipment UE" is an external device carried by the user, and may include a mobile terminal (such as a smartphone, a Personal Digital Assistant (PDA), etc.), a watch detachably connected to a body of the user, and a glass-shaped wearable terminal, etc. The UE may further include a laptop, a desktop computer, a tablet, etc., without being limited thereto. The term "Access Point AP" may refer to all kinds of external devices other than the user equipment (UE), and may include a relay capable of supporting Device-to-Device (D2D) communication, etc.

The key communicator 240 may include at least one of a wired communication module and a wireless communication module. The wired communication module may refer to a module capable of supporting wired communication. The wired communication scheme may include various schemes capable of transmitting and receiving wired signals through a cable, for example, High Definition Multimedia Interface (HDMI), Peripheral Component Interconnect (PCI), PCI-Express, Universe Serial Bus (USB), etc., without being limited thereto. The wired communication scheme may further include various wired communication schemes well known to those skilled in the art.

The wireless communication module may refer to a module capable of supporting wireless communication. The wireless communication scheme may include a wireless communication method (e.g., Long-Term Evolution (LTE), LTE Advanced (LTE-A), Code Division Multiple Access (CDMA), Wideband CDMA (WCDMA), etc.) capable of transmitting and receiving radio frequency (RF) signals through a base station (BS), and a short-range communication scheme (e.g., Wireless LAN, Wi-Fi, Bluetooth, Z-wave, ZigBee, Bluetooth Low Energy (BLE), Near Field Communication (NFC), etc.) capable of transmitting and receiving RF signals to and from the external device located within a predetermined distance. Here, the RF signal may include a voice call signal, a video call signal, or various types of data based on text/multimedia message transmission/reception (Tx/Rx).

The wired communication module may correspond to an integrated circuit (IC) or IC package in which communication modules capable of supporting one or more wired communication schemes are integrated. The wireless communication module may correspond to an IC or IC package in which communication modules capable of supporting one or more wireless communication schemes are integrated. For convenience of description and better understanding of the present disclosure, assuming that the wired communication network and the wireless communication network need not be distinguished from each other, the communication network may be a generic term for the wired communication network and the wireless communication network.

For example, the key communicator 240 may transmit at least one of a voice command, the voice recognition result acquired from the voice command, and a control command to the vehicle 1 through the communication network. In this case, the key communicator 240 may directly transmit data associated with at least one of the voice command, the voice recognition result, and the control command to the vehicle 1, or may transmit the same data to the vehicle 1 through the external device such as the UE or AP.

Meanwhile, the key communicator 240 may also transmit encoded (or encrypted) data of at least one of the voice command, the voice recognition result, and the control command. The encoding process may be carried out through the key controller 250 or may also be carried out through the external device, without being limited thereto.

The key communicator 240 may transmit various kinds of data over the communication network. That is, the key communicator 240 may transmit all kinds of data over the communication network. For security purposes, the key controller 250 may determine whether to encode the voice recognition result on the basis of at least one of a service type and information indicating whether the vehicle key 200 is mounted to the key groove 44.

The vehicle key 200 may include the key controller 250 therein.

The key controller 250 may include a processor (e.g., Micro Control Unit: MCU) capable of processing various kind of operations; and a memory configured to store various kinds of control data needed to control overall operation of the vehicle key.

The key controller 250 may generate a control signal, and may control constituent elements of the vehicle key through the generated control signal. For example, the key controller 250 may activate the voice input 230 through the control signal so as to receive a voice command from the user. In another example, the key controller 250 may control the key communicator 240 through the control signal, such that the key controller 250 may transmit and receive various kinds of data to and from the external device.

In another example, the key controller 250 may identify whether the vehicle key 200 is mounted to the key groove 44, and may decide whether to interact with the voice input 180 embedded in the vehicle 1 on the basis of the result of identification.

For example, if the identification result indicates that the vehicle key 200 is mounted to the key groove 44, the key controller 250 may control the voice input 230 of the vehicle key 200 to interact with the voice input 180 of the vehicle 1. Therefore, the voice input 230 of the vehicle key 200 and the voice input 180 of the vehicle 1 may operate as a dual microphone (MIC).

In another example, if the identification result indicates that the vehicle key 200 is not mounted to the key groove 44, the voice input 230 of the vehicle key 200 may operate as a single microphone (MIC). Therefore, although the voice input or a voice recognition engine is not embedded in the vehicle according to vehicle specifications, the vehicle key 200 may receive a voice command and transmit the voice processing result to the vehicle 1, such that the vehicle 1 may provide various services.

The key controller 250 may perform signal processing of the voice command received through the voice input 230. For example, the voice recognition result from the voice command and the voice recognition engine capable of acquiring a control command corresponding to the voice recognition result may be pre-stored in the memory of the key controller 250. Here, the voice recognition engine is not always stored in the vehicle key 200, and may also be stored in the external device such as the vehicle 1.

The voice recognition function based on the voice recognition engine may be performed by only one of the key controller 250 and the external device, or may be shared by the key controller 250 and the external device. For convenience of description and better understanding of the present disclosure, an exemplary case in which the key controller 250 performs the above voice recognition function will hereinafter be described.

The key controller 250 may acquire the voice recognition result from the signal received from the voice input 230 through the voice recognition engine, and may also acquire a control command corresponding to the voice recognition result. For example, the voice recognition result acquired from the voice command may include a voice waveform, etc. The control command may include a service execution command requested by the user, and the like.

The key controller 250 may transmit data associated with at least one of the voice command, the voice recognition result, and the control command to the vehicle 1. The vehicle 1 may control the constituent elements of the vehicle 1 such that the vehicle 1 may provide the user with desired services.

To this end, the key controller 250 may determine a method for transmitting the above data on the basis of at least one of service type and information indicating whether the vehicle key 200 is mounted to the key groove 44.

Referring to FIG. 6, the vehicle key 200 may be connected to the vehicle 1 according to various schemes. The vehicle key 200 may be directly connected to the vehicle 1. Alternatively, the vehicle key 200 may also be connected to the vehicle 1 through any one of an Access Point (AP) S1 and a User Equipment (UE) S2. In this case, the vehicle key 200 may be connected to any one of the AP S1 and the UE 300, or may be connected to the vehicle 1 through a server S3, without being limited thereto.

If the vehicle key 200 is mounted to the key groove 44, the key controller 250 may directly communicate with the vehicle 1 over a wired communication network through the terminal 45 of the vehicle 1. Therefore, the key controller 250 may transmit data associated with at least one of the voice command, the voice recognition result, and the control command to the vehicle 1 over a wireless communication network, and the vehicle 1 may control constituent elements of the vehicle 1 on the basis of the transmitted data and thus provide a user-requested service.

However, assuming that the vehicle key 200 is not mounted to the key groove 44, there is a limitation in services according to whether the key controller 250 is connected to the vehicle 1 over a communication network. For example, assuming that the vehicle key 200 is not mounted to the key groove 44 and is not connected to the vehicle 1 over the communication network, the key controller 250 may provide only basic remote control services, for example, a warning sound output service, a temperature setting service through the air conditioner 151 (see FIG. 2), etc. An operation mode caused by the basic remote control services will hereinafter be referred to as an independent mode. In other words, during the independent mode, the key controller 250 may transmit only simple control commands, which are activated through laser beam or the like generated when the user presses the manipulation button, to the vehicle 1.

If the vehicle key 200 not mounted to the key groove 44 is connected to the vehicle 1 over a communication network, the key controller 250 may provide the above-mentioned remote control services by interacting with the vehicle 1 over the communication network. In addition, the key controller 250 may interact with the vehicle 1 over the communication network, such that the key controller 250 may execute multimedia services (e.g., destination setting, current position registration, music search, etc.), messenger services (e.g., phone call, text message transmission, etc.), and IoT control services. Here, the above-mentioned operation mode of the key controller 250 will hereinafter be referred to as an interactive mode.

Meanwhile, during the interactive mode, the service types may be changed according to the communication connection scheme. The service types may be classified according to a plurality of service modes. For example, the service mode may include a first service mode, a second service mode, and a third service mode.

The first service mode may refer to a mode in which the vehicle key 200 is connected to the vehicle 1 through the user equipment (UE). The second service mode may refer to a mode in which the vehicle 1 is connected to the vehicle key 200 through the access point (AP). The third service mode may refer to a mode in which the vehicle key 200 not mounted to the key groove 44 is not connected to the vehicle 1 through the external device.

During the third service mode, the vehicle key 200 may not directly transmit data associated with the voice command, the voice recognition result, and the control command, and may transmit only simple control commands through laser beam or the like as described above, such that the encoding process of the above data may not be carried out.

During the second service mode, the user equipment (UE) may store a program, such as an application, capable of supporting interaction between the vehicle 1 and the vehicle key 200. If security is guaranteed through the application stored in the UE, the key controller 250 may not encode the above data, and may transmit the resultant data to the UE.

During the second service mode, security may not be guaranteed, such that the key controller 250 may encode the above data, and may transmit the encoded data to the AP.

During the second service mode or the third service mode, the key controller 250 may provide various services by interacting with the external device. In accordance with one embodiment, the key controller 250 may upload data associated with at least one of the voice command, the voice recognition result, and the control command to the Web server through the external device. In this case, the above data may be mapped to location data measured by either the UE or the vehicle 1, and may be uploaded to the Web server.

During the second service mode, the key controller 250 may store data associated with at least one of the voice command, the voice recognition result, and the control command in the UE. Therefore, the user may confirm the stored data through the UE. In addition, during the second service mode, the key controller 250 may interact with the UE and the vehicle 1, such that the screen of the UE may be mirrored on the display 101 (see FIG. 2), without being limited thereto. The constituent elements of the vehicle will hereinafter be described.

Referring to FIGS. 4 and 7, the vehicle 1 may include a key groove 44 to which the vehicle key 200 is mounted; a charging portion 142 configured to provide the vehicle key 200 mounted to the key groove 44 with a power-supply voltage; a voice input 180 configured to receive a voice command from the user; a vehicle communicator 130 configured to support communication with the external device; a speaker 143 configured to output various kinds of information or music; a display 101 configured to display various kinds of information; a cluster 144; and a vehicle controller 140 configured to control overall operation of the constituent elements embedded in the vehicle 1. The key groove 44, the display 101, the speaker 143, and the cluster 144 have already been disclosed, and as such a detailed description thereof will herein be omitted for convenience of description.

The vehicle communicator 130 and the vehicle controller 140 may be independently provided in the vehicle 1 or may be integrated into a single System On Chip (SOC) mounted to the vehicle key 200, without being limited thereto.

The charging portion 142 may provide the vehicle key 200 with a power-supply voltage. The charging portion 142 may charge the power-supply 220 of the vehicle key 200 through various charging schemes, for example, a wired charging scheme or a wireless charging scheme, without being limited thereto.

If the charging portion 142 charges the power-supply 220 according to the wireless charging scheme, the charging portion 142 may be located to face the power-supply 220 of the vehicle key 200. As described above, the terminal 45 may be mounted to one side of the key groove 44. Therefore, the charging portion 142 may provide the vehicle key 200 mounted to the key groove 44 with a power-supply voltage through the terminal 45.

The vehicle communicator 130 may communicate with the external device.

The vehicle communicator 130 may include at least one of a wireless communication module and a wired communication module. The wireless communication module and the wired communication module have already been disclosed, and as such a detailed description thereof will herein be omitted for convenience of description.

The vehicle communicator 130 may receive at least one of the voice command, the voice recognition result, and the control command from the vehicle key 200 over the wired communication network. In addition, the vehicle communicator 130 may receive the voice command received from the vehicle key 200, the voice recognition result acquired from the voice command, and the control command from the external device over the wireless communication network, without being limited thereto.

The vehicle 1 may include the vehicle controller 140 configured to control overall operation of the constituent elements embedded in the vehicle. The vehicle controller 140 may include a processor, such as an MCU, configured to process various operations; and a memory configured to store various kinds of control data used to control overall operation of the constituent elements embedded in the vehicle 1.

The vehicle controller 140 may generate a control signal, and may control constituent elements of the vehicle 1 through the generated control signal.

The vehicle controller 140 may control the constituent elements of the vehicle 1 on the basis of at least one of the voice command, the voice recognition result, and the control command received through the vehicle communicator 130, such that the vehicle controller 140 may provide user-requested services.

For example, the vehicle controller 140 may provide a multimedia service capable of reproducing user-requested moving images by controlling the display 101 and the speaker 143. In another example, the vehicle controller 140 may provide a navigation service by controlling the AVN terminal 100 (see FIG. 2), the display 101, and the speaker 143.

The vehicle controller 140 may perform all or some of functions of the above-mentioned key controller 250. The functions of the key controller 250 have already been disclosed, and as such a detailed description thereof will herein be omitted for convenience of description. Operations of the vehicle key and the vehicle will hereinafter be described.

Figure 8:
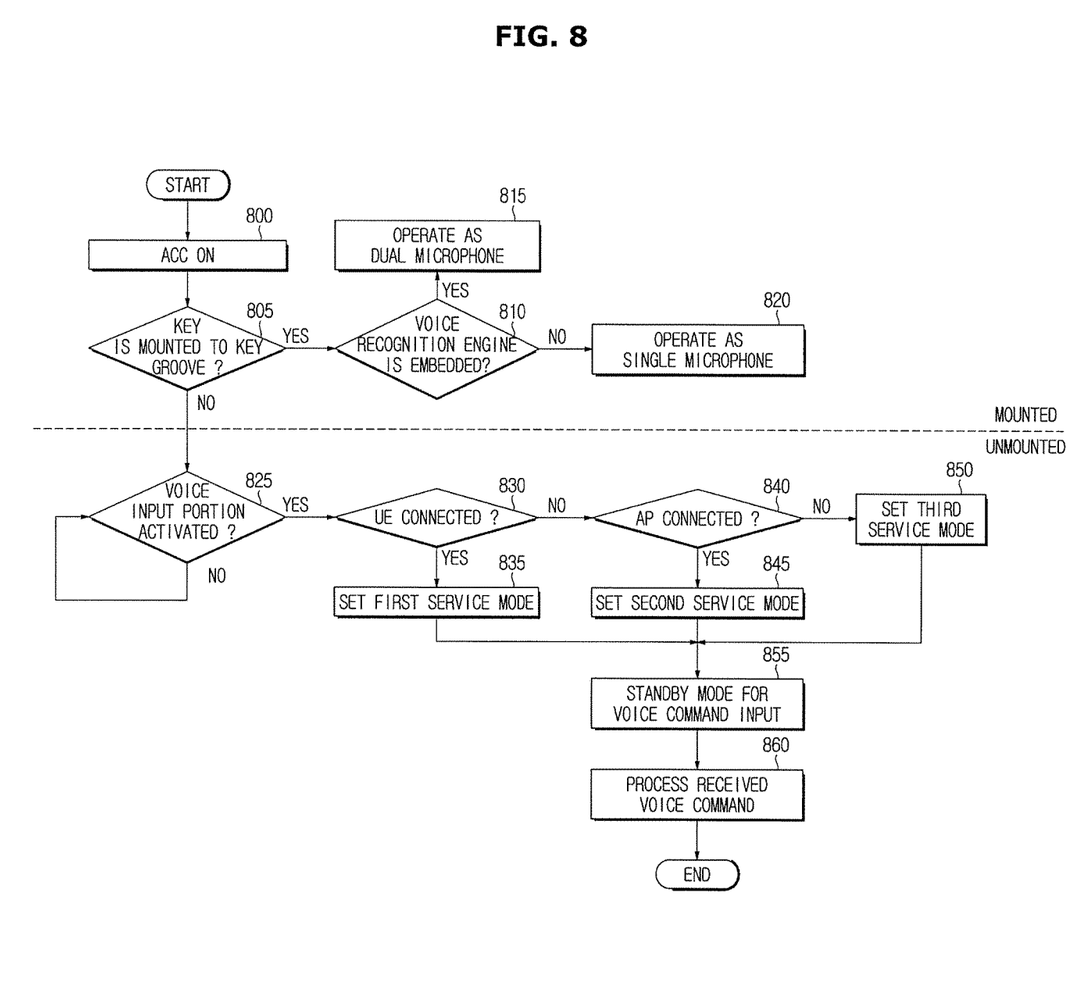
FIG. 8 is a flowchart illustrating operations based on at least one of installation or non-installation of the vehicle key and service types according to an embodiment of the present disclosure.

FIG. 8 is a flowchart illustrating operations based on at least one of installation or non-installation of the vehicle key and service types according to an embodiment of the present disclosure.

Devices embedded in the vehicle may have different rating factors needed to operate the respective devices. In this case, the rating factors of the devices embedded in the vehicle need to be standardized such that all or some of the devices embedded in the vehicle may operate in a specific situation. Therefore, the rating factors (i.e., power-supply conditions) needed for the respective devices embedded in the vehicle may be identical to or different from each other.

In accordance with one embodiment, the power-supply conditions may be classified into IGN 1 (Ignition 1), IGN 2 (Ignition 2), ACC (Accessory), B+ (Battery +), ST (Start), and OFF (Off). IGN 1 may refer to a power-supply condition needed to start and operate the vehicle. For example, IGN 1 may refer to a power-supply condition needed to operate an engine, an automatic transmission, a brake, etc. IGN 2 may refer to a power-supply condition of auxiliary devices needed to operate the vehicle. For example, IGN 2 may refer to a power-supply condition of a windshield wiper, an air conditioner, and a sunroof, etc.

ACC may refer to a power-supply condition of the devices embedded in the vehicle for convenience of the driver and passengers. For example, ACC may refer to a power-supply condition of an audio player, a cigar jack, a charging portion, a voice input, etc., and may also refer to a power-supply condition of the AVN terminal, the display, the vehicle communicator, the speaker, etc.

ST may refer to a power-supply condition for starting the vehicle. In addition, B+ may refer to a power-supply condition needed for a regular power supply. For example, indoor devices that need to operate at ordinary times may correspond to the power-supply condition "B+". The respective power-supply conditions may have different voltages and different currents as necessary.

For example, if the power-supply condition (ACC) is turned on (Operation 800), the vehicle may determine whether the vehicle key is mounted to the key groove through the terminal (Operation 805). If it is determined that the vehicle key is mounted to the key groove, the vehicle may determine whether or not the voice recognition engine is embedded (Operation 810). If the voice recognition engine is embedded in the vehicle, the vehicle may operate the voice input of the vehicle key mounted to the vehicle and the other voice input embedded in the vehicle as the dual microphone (Operation 815). In addition, if it is determined that the voice recognition engine is not embedded in the vehicle, the vehicle may operate the voice input of the vehicle key mounted to the vehicle as a single microphone, such that the vehicle may provide a voice recognition function (Operation 820).

Meanwhile, if it is determined that the vehicle key is not mounted to the key groove, the vehicle key may activate the voice input of the vehicle key (Operation 825). In other words, the voice input of the vehicle key may be activated such that a current mode may be shifted to a standby mode in which the voice input may receive a voice command from the user. The user may also directly press the manipulation button mounted to the vehicle key such that the voice input may enter the standby mode, without being limited thereto.

If it is determined that the voice input is activated, the vehicle key may establish the service mode according to a connection scheme between the vehicle key and the vehicle. For example, the vehicle key may determine whether to connect to the UE over the communication network (Operation 830). If it is determined that the vehicle key is connected to the UE over the communication network, the vehicle key may set the service mode to the first service mode (Operation 835).

If the vehicle key is not connected to the UE, the vehicle key may determine whether to connect to the AP over the communication network (Operation 840). If the vehicle key is connected to the AP over the communication network, the vehicle key may set the service mode to the second service mode (Operation 845). If the vehicle key is not connected to the external device such as the UE or AP, the vehicle key may set the service mode to the third service mode (i.e., an independent mode) (Operation 850).

If the service mode setting is completed, the standby mode capable of receiving the voice command is achieved (Operation 855), the vehicle key may process the received voice command according to the established service mode (Operation 860).

For example, the vehicle key may determine whether to transmit at least one of data associated with at least one of the voice recognition result acquired from the voice command and the control command according to the service mode. In addition, if the vehicle key decides to transmit the above data, the vehicle key may determine whether the above data will be encoded and transmitted according to the service mode.

The above-mentioned method disclosed in the embodiments of the present disclosure may be implemented in the form of programs executable by a variety of computer means, and may be recorded in a computer-readable recording medium. The computer-readable recording medium may include program commands, data files, data structures, etc. individually or in combination. The program commands recorded in the computer-readable recording medium may be particularly designed and configured, or may be well known to those skilled in the art related to computer software. Examples of the computer readable recording media may include magnetic disc storage media, such as a hard disk or a floppy disk, and a magnetic tape, optical media, such as a CD-ROM and a digital versatile disk (DVD), magneto-optical media, such as a floptical disk, and hardware devices, such as a read only memory (ROM), a random access memory (RAM), and a flash memory, which are particularly configured to store and execute program commands.

Examples of the program commands may include, for example, high-level language codes executable by a computer using an interpreter as well as machine language codes generated by a complier. The hardware devices may be configured to function as one or more software modules to perform the operation of the present invention, or vice versa.

Although the above-mentioned embodiments of the present disclosure have been disclosed herein merely for illustrative purposes, the scope or spirit of the embodiments is not limited thereto, and those skilled in the art will appreciate that various modifications, additions and substitutions are possible, without departing from the scope and spirit of the disclosure as disclosed in the accompanying claims. For example, adequate effects of the present disclosure may be achieved even if the foregoing processes and methods may be carried out in different order than described above, and/or the aforementioned elements, such as systems, structures, devices, or circuits, may be combined or coupled in different forms and modes than described above or be substituted or switched with other components or equivalents.

Therefore, other implementations, other embodiments, and all changes coming within the equivalency range of the appended claims are intended to be embraced therein.

As is apparent from the above description, the embodiments of the present disclosure may receive a voice command through a vehicle key, may acquire the result of voice recognition and a control command on the basis of the received voice command, and may control the vehicle using the acquired voice recognition result and control command, resulting in protection of personal user information.

The embodiments of the present disclosure may support a voice recognition function even when a voice input or voice recognition engine is not embedded in the vehicle.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vehicle key comprising:
   a first voice input configured to receive a voice command of a user; and
   a key controller configured to determine at least one of a service type or information indicating whether the vehicle key is disposed in a key groove of a vehicle, and to process at least one of a voice recognition result acquired from the voice command or a control command corresponding to the voice recognition result based on a result of determination,
   wherein the key controller determines an operation method of the first voice input based on the information indicating whether the vehicle key is disposed in the key groove of the vehicle, and
   when the vehicle key is disposed in the key groove of the vehicle, the key controller controls the first voice input and a second voice input included in the vehicle to interact with each other such that the first voice input and the second voice input operate as a dual microphone.

2. The vehicle key according to claim 1, wherein the key controller determines a security grade based on the result of determination.

3. The vehicle key according to claim 2, wherein the key controller determines whether to encode at least one of the voice recognition result or the control command corresponding to the voice recognition result based on the security grade.

4. The vehicle key according to claim 1, wherein the key controller determines a transmission method of at least one of the voice recognition result acquired from the user voice command or the control command corresponding to the voice recognition result based on the result of determination.

5. The vehicle key according to claim 1, wherein the key controller calculates a position of the user who rides in the vehicle using the first voice input and the second voice input included in the vehicle, and controls beamforming based on a result of calculation.

6. A vehicle comprising:
   a vehicle communicator configured to receive data associated with at least one of at least one user's voice command, a voice recognition result, or a control command, which are received through a vehicle key;
   a vehicle controller configured to provide a service by controlling a device included in the vehicle based on the received data; and
   a first voice input configured to receive a voice command of the at least one user,
   wherein the vehicle controller determines whether the vehicle key is disposed in a key groove, and controls the first voice input to interact with a second voice input included in the vehicle key so that the first voice input and the second voice input operate as a dual microphone when the vehicle key is disposed in the key groove.

7. The vehicle according to claim 6, wherein the vehicle controller calculates a position of the at least one user using at least one of the first voice input or the second voice input included in the vehicle key.

8. The vehicle according to claim 7, wherein the vehicle controller performs beamforming based on the position of the at least one user.

9. The vehicle according to claim 6, wherein the vehicle controller determines whether to perform a decoding process of the data associated with at least one of the voice command, the voice recognition result, or the control command according to a service type and information indicating whether the vehicle key is disposed in the key groove.

10. A method for controlling a vehicle key comprising steps of:
   receiving a voice command of a user;
   determining at least one of a service type or information indicating whether the vehicle key is disposed in a key groove of a vehicle;
   processing at least one of a voice recognition result acquired from the user voice command or a control command corresponding to the voice recognition result based on a result of determination;
   determining an operation method of a first voice input based on the information indicating whether the vehicle key is disposed in the key groove of the vehicle; and
   when the vehicle key is disposed in the key groove of the vehicle, interacting the first voice input included in the vehicle key and a second voice input included in the vehicle with each other, and allowing the first voice input and the second voice input to operate as a dual microphone.

11. The method according to claim 10, wherein the step of processing includes:
   determining a security grade based on the result of determination.

12. The method according to claim 11, wherein the step of processing further includes:
   determining whether to encode at least one of the voice recognition result or the control command corresponding to the voice recognition result based on the security grade.

13. The method according to claim 10, wherein the step of processing further includes:
   determining a transmission method of at least one of the voice recognition result acquired from the user voice command or the control command corresponding to the voice recognition result based on the result of determination.

14. A method for controlling a vehicle comprising steps of:
   receiving data associated with at least one of at least one user's voice command, a voice recognition result, or a control command, which are received through a vehicle key;
   providing a service by controlling a device included in the vehicle based on the received data; and
   receiving a voice command of the at least one user;
   wherein the step of providing a service includes:
      determining whether the vehicle key is disposed in a key groove; and
      when the vehicle key is disposed in the key groove, controlling a first voice input included in the vehicle to interact with a second voice input included in the vehicle key so that the first voice input and the second voice input operate as a dual microphone.

15. The method according to claim 14, wherein the step of providing, a service further includes calculating a position of the at least one user using at least one of the first voice input or the second voice input included in the vehicle key.

16. The method according to claim 15, wherein the step of providing a service further includes performing beamforming based on the position of the at least one user.

17. The method according to claim 14, wherein the step of providing a service further includes determining whether to perform a decoding process of the received data according to a service type and information indicating whether the vehicle key is disposed in the key groove.

* * * * *